（12） United States Patent
Tite et al.

(10) Patent No.: US 6,419,044 B1
(45) Date of Patent: *Jul. 16, 2002

(54) ENERGY SOURCE FOR USE IN SEISMIC ACQUISITIONS

(75) Inventors: Glen-Allan S. Tite, Stafford; James E. Brooks, Manvel; Paul A. Lezak, Lake Jackson, all of TX (US)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/553,463

(22) Filed: Apr. 19, 2000

Related U.S. Application Data

(60) Provisional application No. 60/130,220, filed on Apr. 20, 1999.

(51) Int. Cl.[7] .................................................. G01V 1/06
(52) U.S. Cl. ....................... 181/116; 181/104; 181/105; 181/106; 181/108; 181/111; 181/112; 181/113
(58) Field of Search ................................. 181/116, 104, 181/105, 106, 108, 111, 112, 113

(56) References Cited

U.S. PATENT DOCUMENTS

| 2,757,750 | A | * | 8/1956 | Hawkins et al. ............. 181/107 |
| 3,702,635 | A | | 11/1972 | Farr |
| 3,752,242 | A | | 8/1973 | Gremillion |
| 3,997,021 | A | * | 12/1976 | Chelminski ................. 181/106 |
| 4,793,435 | A | | 12/1988 | Smith et al. |
| 4,881,207 | A | | 11/1989 | Dubesset et al. |
| 4,895,218 | A | | 1/1990 | Chen et al. |
| 4,974,671 | A | | 12/1990 | Omnes |
| 5,098,487 | A | | 3/1992 | Brauer et al. |
| 5,109,946 | A | | 5/1992 | Sorrells |
| 5,124,956 | A | * | 6/1992 | Rice et al. ................... 367/178 |
| 5,278,359 | A | | 1/1994 | Miller et al. |
| 5,281,775 | A | | 1/1994 | Gremillion |
| 5,343,002 | A | * | 8/1994 | Gremillion .................. 181/116 |
| 5,563,846 | A | | 10/1996 | Fillon |
| 5,714,712 | A | | 2/1998 | Ewick et al. |
| 5,792,977 | A | * | 8/1998 | Chawla ...................... 102/307 |
| 5,860,482 | A | | 1/1999 | Gremillion et al. |
| 5,907,132 | A | | 5/1999 | Hardage |
| 6,023,657 | A | | 2/2000 | Kerekes |

FOREIGN PATENT DOCUMENTS

| DE | 3900458 A1 | 7/1990 |
| WO | WO 96/01408 | 1/1996 |
| WO | WO 96/29613 | 9/1996 |

OTHER PUBLICATIONS

Wolf D. Weber and Graham R. Johnson, Environmentally Sound Transition–Zone Marine Vibrator, Journal of Petroleum Technology, Jan. 1999, 2 pages.

Weber, Wolf D. and Johnson, Graham R.; Environmentally Sound Transition–Zone Vibrator; a synopsis of paper "An Environmentally Sound Geophysical Source—The Transition–Zone Marine Vibrator", presented at 1998 SPE International Conference on Health, Safety and Environment in Oil and Gas Exploration and Production, Caracas Jun. 7–10.

* cited by examiner

Primary Examiner—Shih-Yung Hsieh
(74) Attorney, Agent, or Firm—Dan C. Hu; Jeffrey E. Griffin; Brigitte L. Jeffery

(57) ABSTRACT

A seismic acquisition system includes one or more perforating shaped charge modules activable to generate seismic signals into an earth sub-surface. The seismic signals are created by perforating jets formed by the perforating shaped charge modules when activated. The perforating jets produce directional seismic signals that reduce the amount of lateral noise. One or more detectors are employed to receive signals reflected from the earth sub-surface in response to the seismic signals.

36 Claims, 3 Drawing Sheets

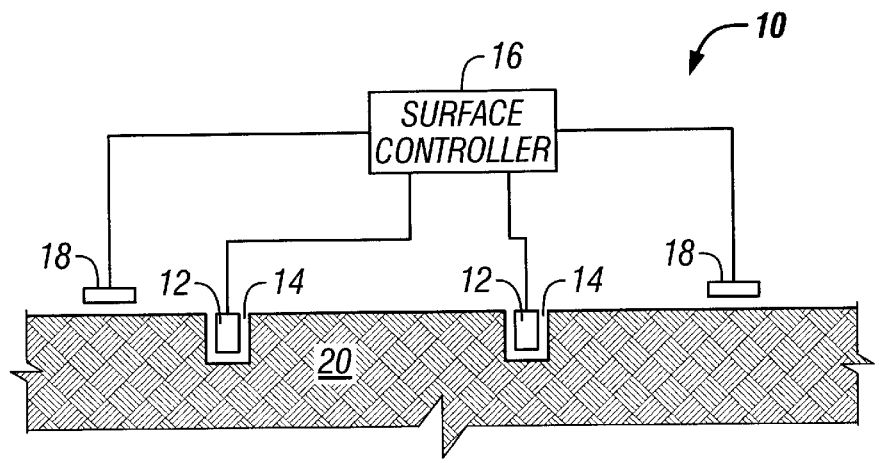
FIG. 1
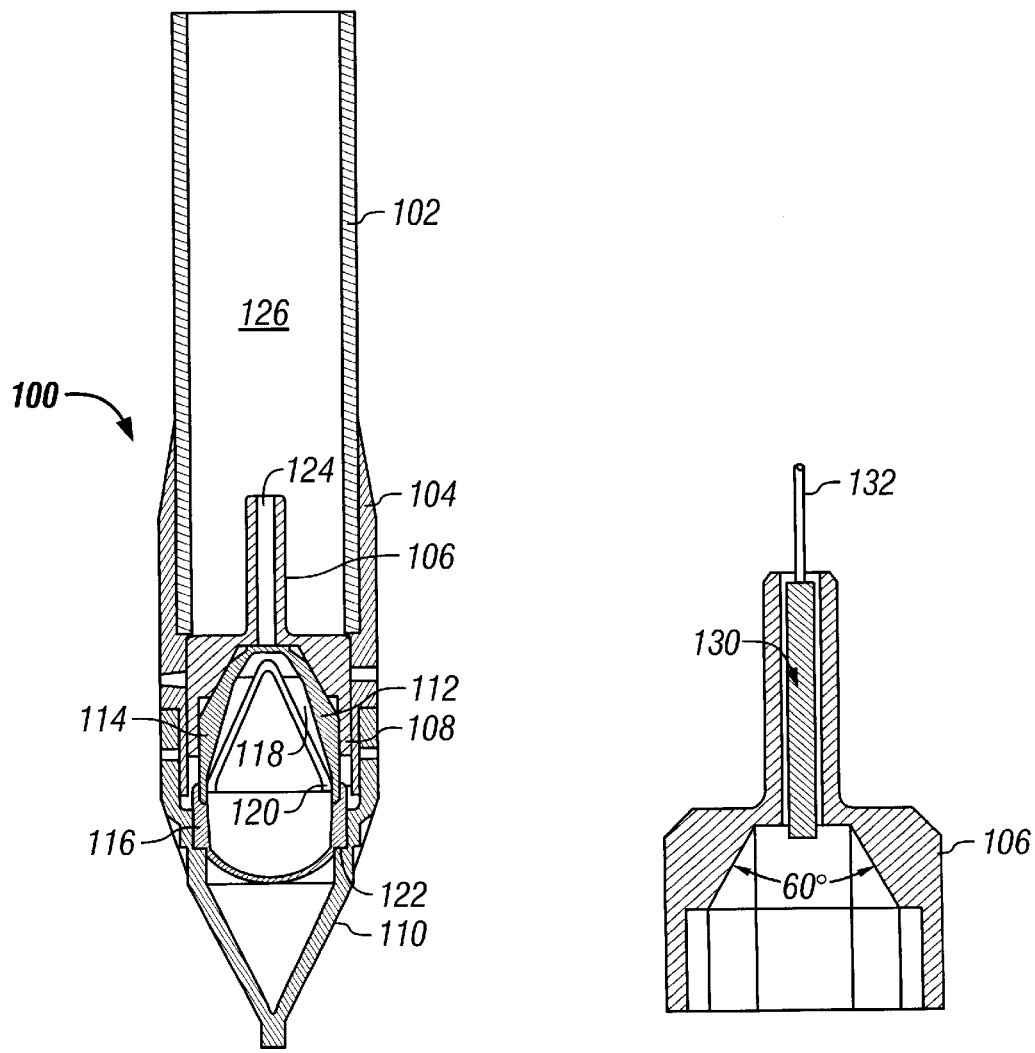
FIG. 2
FIG. 3

ENERGY SOURCE FOR USE IN SEISMIC ACQUISITIONS

This application claims the benefit, under 35 U.S.C. § 119, of U.S. Provisional Patent Application Serial No. 60/130,220, entitled, "Energy Source for Use in Seismic Acquisitions," filed on Apr. 20, 1999.

BACKGROUND

The invention relates to energy sources used for acquisition of seismic data of sub-surface formations.

To perform a field seismic survey of the earth's sub-surface, a seismic energy source is used to generate a seismic signal (also referred to as a seismic pressure wave). The seismic signal is transmitted into the earth's sub-surface, and a portion of the seismic signal is reflected back towards the surface of the earth where one or more detectors may be positioned to receive the reflected signal. The seismic data received is used to determine geophysical information about the earth's sub-surface.

A typical energy source used for seismic acquisition includes dynamite that is exploded in a hole of some depth. For reliable performance, the dynamite may need to be placed in a relatively deep hole. In addition, multiple holes may be employed to create a pattern of seismic signals. Explosion of the dynamite creates expanding gas volume, downwardly moving shock waves as well as a substantial amount of lateral shock waves that are directed side ways. Useful data typically is derived from reflected signals of downwardly moving shock waves. The lateral shock waves from the energy source generate noise trains that frequently reduce the detector's ability to see the reflected signal. Another disadvantage of using explosives such as dynamite as energy sources in seismic acquisition is that explosions may disrupt the environment around the survey site. With increased environmental protection concerns, use of such energy sources is generally not desirable, especially in environmentally sensitive areas.

Various types of alternative energy sources have been proposed or implemented. For example, use of air-gun energy sources as well as low frequency marine vibrators have been used. However, a need continues to exist for improved energy sources used in seismic acquisition systems.

SUMMARY

In general, according to an embodiment, a seismic acquisition system includes an energy source having a perforating shaped charge to generate a seismic signal. A detector is positioned to detect a reflected signal in response to a seismic wavefront.

Other features and embodiments will become apparent from the following description and from the claims.

BRIEF DESCRIPTION OF THE DRAWINGS

FIG. 1 illustrates an embodiment of a seismic acquisition system.

FIG. 2 illustrates an energy source including a perforating shaped charge according to one embodiment that is used in the seismic acquisition system of FIG. 1.

FIG. 3 illustrates a charge retainer, detonator, and detonating wire in the energy source of FIG. 2.

DETAILED DESCRIPTION

Figure 4:
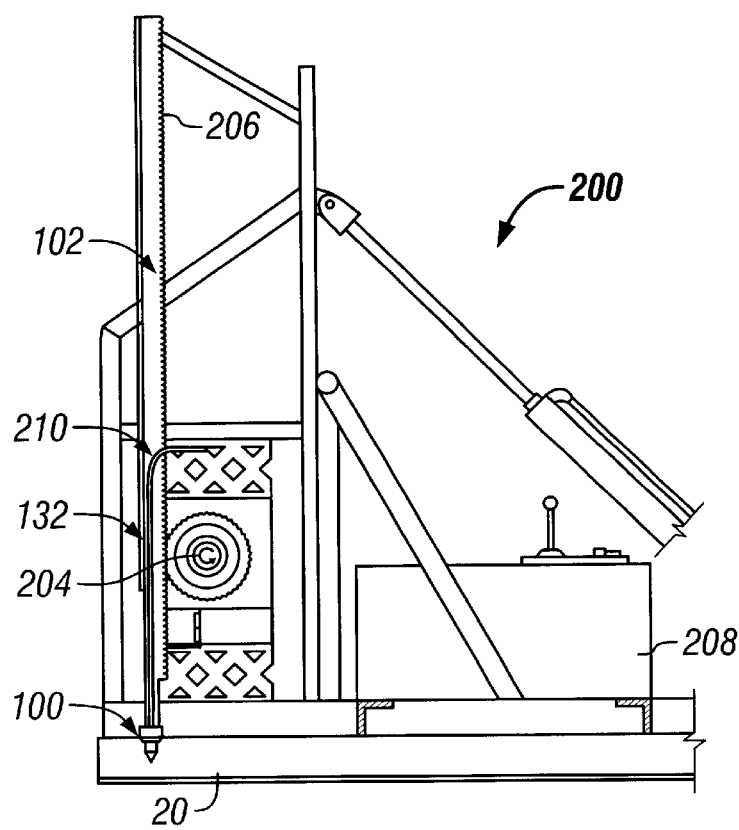
FIG. 4 illustrates a ramming system for positioning the energy source of FIG. 2 in the earth.

In the following description, numerous details are set forth to provide an understanding of the present invention. However, it will be understood by those skilled in the art that the present invention may be practiced without these details and that numerous variations or modifications from the described embodiments may be possible.

According to some embodiments of the invention, an energy source used in a seismic acquisition system includes a perforating shaped charge that when detonated produces a perforating jet that penetrates the earth's sub-surface. The perforating jet of the shaped charge is used as an energy propagating medium, which is different from typical energy sources (which may include dynamite) used in conventional systems. As used here, "perforating shaped charge" refers to any explosive device that produces a perforating jet directed along a general direction. One or more energy sources including perforating shaped charges positioned near the earth's surface are activated to generate seismic signals (from formation of corresponding perforating jets). Signals reflected from the earth sub-surface are then detected and measured to determine characteristics of the earth's sub-surface.

Referring to FIG. 1, a seismic acquisition system 10 may include one or more energy sources 12 that are positioned in holes 14 of predetermined depths, e.g., less than about 100 feet. The depth may be selected between a range of about 10–100 feet. The holes 14 may have relatively shallow depths due to the improved energy propagation medium provided by a perforating jet. The energy sources 12 may be coupled to a surface controller 16, where an operator may selectively activate one or more of the energy sources 12.

Activation of the surface controller 16 causes detonation of the perforating shaped charges, which propagates energy along desired paths (in most cases along generally downward paths). The propagated energy is generally along the direction of the perforating jet. An advantage of using a perforating shaped charge in the energy source 12 according to some embodiments is the improved ability to control the direction of seismic signals sent into the earth's sub-surface 20. By using perforating shaped charges, generation of lateral signals that contribute to noise may be reduced. Reflected signals from the sub-surface 20 may be received by one or more detectors 18 positioned at or in the surface. The detectors 18 may be coupled to the surface controller 16, which may receive the acquired data for processing and/or storage.

Referring to FIG. 2, a perforating shaped charge (PSC) assembly 100 for use as an energy source 12 includes a perforating shaped charge (PSC) module 112 that includes) housing sections 114 and 116. An explosive charge 118 is contained inside the shaped charge housing section 114, with a liner 120 lining the outside of the explosive charge 118. The housing section 114 provides the container for the explosive charge, while the housing section 116 is attached to the housing section 114 to provide a sealed cap. Other arrangements of the PSC module 112 may also be possible in further embodiments.

As illustrated in FIG. 2, the shaped charge has a generally conical liner that is adapted to provide a relatively narrow and deep perforating jet. Upon detonation of the explosive charge 118, the liner 120 collapses to form a directional perforating jet. Generally, the liner 120 is formed of a metallic material, e.g., copper, nickel, silver, gold, tantalum, lead, tungsten, or a metal alloy. Other types of materials may also be used that are sufficiently high density and ductile. In other embodiments, a perforating shaped charge may not incorporate a liner as part of the charge cavity, relying instead on a lower density jet formed from explosive gases. In such embodiments, the perforating shaped charge includes a cavity containing an explosive charge that is un-lined.

In alternative embodiments, liners of other shapes may also be implemented, including liners having generally the following shapes: hemispherical, parabolic, trumpet, tulip, and so forth. Such other types of liners may generally be referred to as generally bowl-shaped, and are often adapted to produce wider and shallower perforating jets than conical liners. Perforating shaped charges employing these types of liners may be referred to as big hole perforating shaped charges. The geometry of the liners determines the width- and depth of the perforating jet once the shaped charge in the perforating charge module 112 is detonated.

An un-lined shaped charge may include an explosive shaped to either a generally conical or bowl-shaped geometry.

In the illustrated embodiment of FIG. 2, the PSC module 112 is attached to an anchor 110. The anchor 10 provides a shoulder 122 on which a portion of the shaped charge housing section 116 sits The upper portion of the anchor 110 engages a ramming stem collar adapter 104. To hold the PSC module 112 in place, a charge retainer 106 is mounted and secured over the module 112. The retainer 106 includes a bore 124 in which a detonator 130 (FIG. 3).may be positioned. The detonator 130 is ballistically coupled to or engaged with the explosive charge 118 in the shaped charge module 112. The detonator 130 is also coupled to a detonating wire 132 that extends into the bore 126 of a ramming pipe 102 that is attached to the ramming stem collar adapter 104. Alternatively, a ramming member other than the ramming pipe 102 may be attached to the PSC assembly 100.

The PSC assembly 100 that is fitted to the end of the ramming pipe 102 may be rammed into the ground to position the PSC assembly at a desired depth. Referring further to FIG. 4, the ramming pipe 102 is part of a ramming system 200. A ratchet member 206 is attached along a longitudinal portion of the ramming pipe 102. The ratchet member 206 is engaged to be moved up or down by rotational movement of a gear 204 that is driven by a motor 208. In the ramming system 200, an opening 210 may be provided in the ramming pipe 102 through which the detonating wire 132 may be passed through to connect to a detonating device (not shown).

In other embodiments, other types of ramming systems may be used. For example, the ramming pipe 102 (or other ramming member) may be manipulated by hand to enable operators to manually (by use of loading poles, for example) ram one or more PSC assemblies 100 into the ground. Because of the improved shock communication characteristics of perforating shaped charges, the depth at which the PSC assemblies 100 are placed may be sufficiently shallow to enable such manual ramming. Manual ramming is particularly feasible if the earth is sufficiently soft. A benefit offered by manual ramming is that heavy equipment, such as the ramming system 200 (FIG. 4), may be avoided at the survey site. In other embodiments, instead of ramming the PSC assembly 100 into the ground, one or more holes may be drilled followed by placement of one or more PSC assemblies into the drilled holes.

According to some embodiments, the loading sequence of the PSC assembly 100 may be as follows. The PSC module 112 is placed and secured in (or otherwise fixed with respect to) the disposable anchor 110. The charge retainer 106 is then placed over the PSC module 112 and the detonator 130 is positioned in the charge retainer 106. The PSC assembly 100 is then attached to the ramming pipe 102, with the detonating wire 132 passed through the inner bore 126 of the ramming pipe 102. The PSC assembly 100 is then rammed into the ground, either by hand or by using a ramming system (such as system 200). After the PSC assembly 100 is rammed into the ground to some predetermined depth below the surface, the ramming pipe 102 detaches from the PSC assembly 100 as the ramming pipe 102 is retracted. The detonating wires are then attached to a detonating device, and the acquisition phase can begin.

Figure 5:
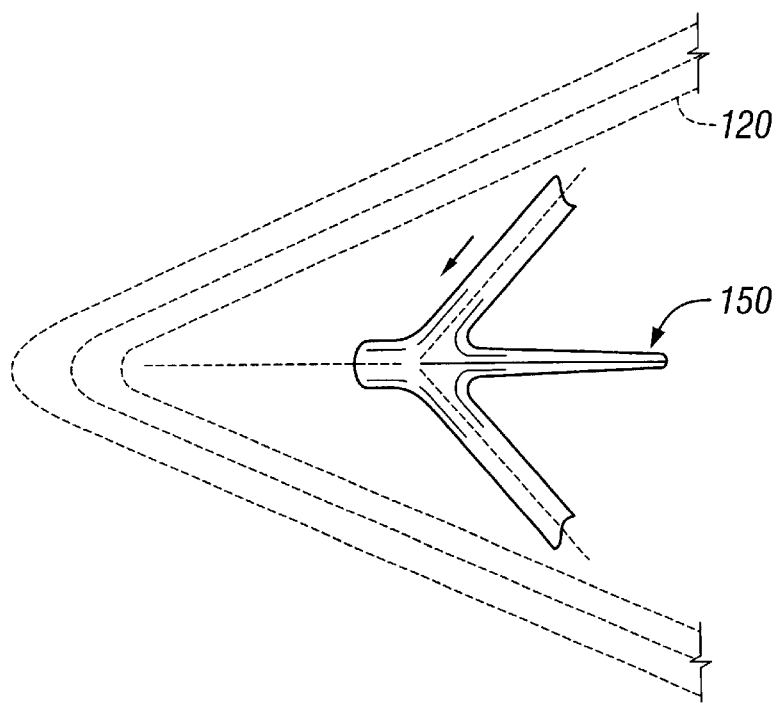
FIG. 5 illustrates detonation of a perforating shaped charge with a conical liner in which a perforating jet is formed.
Figure 6:
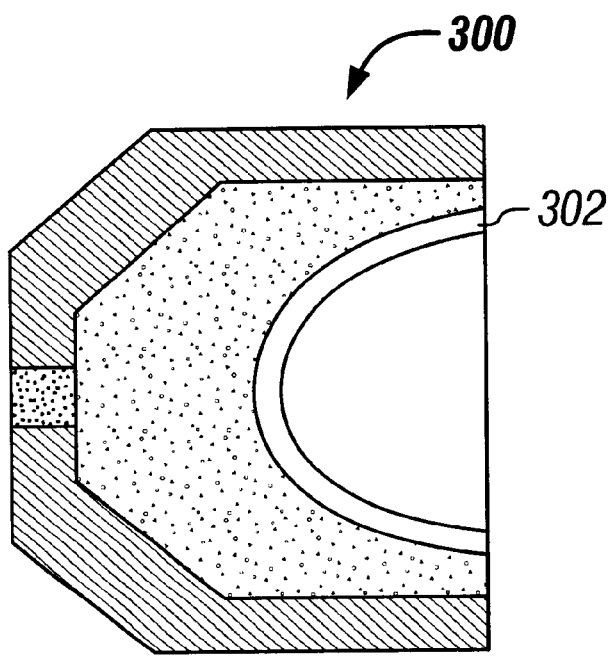
FIG. 6 illustrates a perforating shaped charge with a generally bowl-shaped liner.
Figure 7:
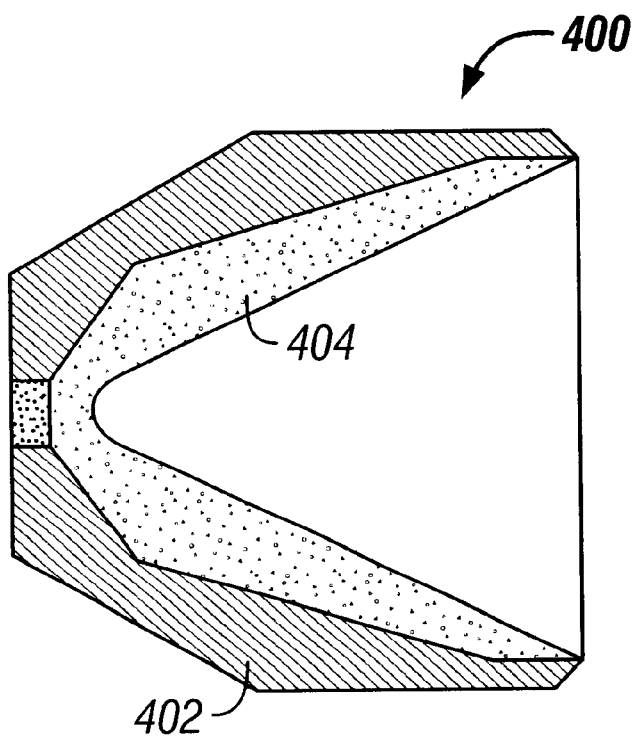
FIG. 7 illustrates a perforating shaped charge without a liner.

When an electrical signal is transmitted over the detonating wire 132, the detonator 130 is initiated. This causes detonation of the explosive charge 118, which in turn causes the collapse of the liner 120. As illustrated in FIG. 5, formation of a perforating jet 150 from detonation of the explosive charge 118 and collapse of the liner 120 is illustrated. As illustrated, the perforating jet 150 is highly directional. Due to the conical shape of the liner 120, a narrower and deeper jet is formed. However, if a big hole charge, such as a charge 300 shown in FIG. 6, having a generally bowl-shaped liner 302 is employed, then the produced perforating jet (not shown) may be wider and slightly shallower. As shown in FIG. 7, a perforating shaped charge 400 may also be designed without a liner. The shaped charge 400 includes an explosive 404 contained in a housing section 402. With the liner-less perforating shaped charge, the explosive is shaped to produce a lower density perforating jet produced from explosive gases. The explosive 404 may be formed to various shapes, such as generally conical or generally bowl-shaped (e.g., hemispherical, parabolic, trumpet, tulip, etc.).

The PSC assembly 100 in accordance with some embodiments, may be used in many applications, including environmentally-sensitive applications. Seismic surveys can be performed in transition zone applications where explosive charges may be mechanically rammed into a soft clay, sand, or mud sub-surface to predetermined depths. The ramming technique provides a superior, more reliable earth-to-charge coupling than conventional techniques. Due to the enhancement in charge coupling according to some embodiments, the requirement for deeper holes may be significantly reduced.

Some embodiments of the invention have one or more of the following advantages. Increased downward energy is provided due to the directional perforating jet of a shaped charge. Because of the directivity of seismic energy produced by a PSC assembly, less explosive weight per charge may be employed. In addition, because of the directivity of the seismic signal generated by the PSC assembly according to embodiments, improved data quality may be provided since the signal-to-noise ratio is increased. Because of less laterally coupled energy (ground roll) that is generated by energy sources according to some embodiments, the need for multiple pattern holes may be reduced and in some cases eliminated. As a result, the drilling effort and associated costs may be reduced and productivity may be increased. In addition, due to increased charge directivity and charge couple improvements, surface blow-outs (cratering) due to bridging may be reduced.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A seismic acquisition system comprising:
   an energy source including a perforating shaped charge to generate a seismic signal, the shaped charge having a housing;
   a detector positioned to detect a reflected signal in response to a seismic wavefront;
   an anchor attached to the perforating shaped charge; and
   a retainer placed over the shaped charge housing and adapted to hold the perforating shaped charge in place, the retainer containing a detonator ballistically coupled to the perforating shaped charge.

2. The seismic acquisition system of claim 1, wherein the housing of the perforating shaped charge is fixed with respect to the anchor.

3. The seismic acquisition system of claim 1, further comprising a ramming member to drive the anchor into a ground surface.

4. The seismic acquisition system of claim 3, wherein the ramming member includes a ramming pipe engageable by a ramming system.

5. The seismic acquisition system of claim 3, wherein the ramming member is adapted to be manually manipulated by a user.

6. The seismic acquisition system of claim 1, further comprising at least another energy source.

7. The seismic acquisition system of claim 1, further comprising at least another detector.

8. The seismic acquisition system of claim 1, wherein the perforating shaped charge is positioned to direct the perforating jet into an earth sub-surface.

9. The system of claim 1, wherein the perforating shaped charge includes a liner that contributes to generation of the perforating jet.

10. The system of claim 9, wherein the liner is generally conically shaped.

11. The system of claim 9, wherein the liner is generally bowl-shaped.

12. The system of claim 1, wherein the perforating shaped charge includes a cavity containing an explosive that is un-lined.

13. The seismic acquisition system of claim 1, wherein the anchor comprises a housing to receive the perforating shaped charge, the housing of the anchor having a tapered portion for insertion into the earth sub-surface.

14. The seismic acquisition system of claim 1, wherein the anchor is attached to one side of the perforating shaped charge and the retainer is engaged to another side of the perforating shaped charge.

15. The seismic acquisition system of claim 14, further comprising a ramming pipe coupled to the anchor.

16. The seismic acquisition system of claim 15, further comprising a detonating wire coupled to the detonator, wherein the ramming pipe has an inner bore through which the detonating wire is extended.

17. The seismic acquisition system of claim 16, wherein the ramming pipe fits over the retainer.

18. The seismic acquisition system of claim 1, wherein the perforating shaped charge has an explosive, and wherein the retainer has a bore receiving the detonator, the detonator coupled for point initiation of the explosive in the perforating shaped charge.

19. The seismic acquisition system of claim 18, wherein the anchor has a profile to which the perforating shaped charge is engaged, the detonator adapted to hold the perforating shaped charge against the profile.

20. The seismic acquisition system of claim 19, wherein the retainer has a profile to engage one side of the perforating shaped charge.

21. A method of acquiring seismic data requesting a characteristic of an earth sub-surface, comprising:
   positioning an energy source having a perforating shaped charge in an anchoring device, the perforating shaped charge having a housing;
   providing a retainer placed over the shaped charge housing to hold the perforating shaped charge in the anchoring device;
   providing a detonator in the retainer that is ballistically coupled to the perforating shaped charge;
   inserting the anchoring device into the earth sub-surface; and
   activating the perforating shaped charge to transmit a seismic signal into the earth sub-surface.

22. The method of claim 21, wherein activating the perforating shaped charge generates a perforating jet.

23. The method of claim 21, further comprising arranging plural energy sources each including the perforating shaped charge in respective anchoring devices and activating the perforating shaped charges to create seismic signals.

24. The method of claim 21, wherein inserting the anchoring device into the earth sub-surface is performed manually by a user.

25. The method of claim 21, herein inserting the anchoring device into the earth sub-surface is performed with a ramming system.

26. The method of claim 21, further comprising:
   providing further energy sources having respective perforating shaped charges in respective further anchoring devices; and
   inserting the further anchoring devices into the earth sub-surface.

27. The method of claim 21, wherein providing the retainer comprises providing a retainer having a profile engaged to the perforating shaped charge.

28. The method of claim 27, wherein providing the retainer further comprises providing a bore in the retainer to hold the detonator, the method further comprising coupling the detonator to an explosive in the perforating shaped charge for point initiation.

29. The method of claim 21, further comprising:
   attaching a ramming pipe to the anchoring device; and
   attaching a detonating wire provided through an inner bore of the ramming pipe to the detonator.

30. The method of claim 29, further comprising providing a profile in the anchoring device to which the perforating shaped charge is engaged, the retainer holding the perforating shaped charge against the profile of the anchoring device.

31. An apparatus for use in a seismic acquisition system, comprising:
   a plurality of perforating shaped charges each activable to generate a seismic signal into an earth sub-surface, each perforating shaped charge having a housing;

a plurality of anchor devices attached to respective perforating shaped charges to anchor the perforating shaped charges in the earth sub-surface;

a plurality of retainers adapted to hold the perforating shaped charges in respective anchor devices, each retainer placed over a respective shaped charge housing; and a plurality of detonators provided in respective retainers and ballistically coupled to the perforating shaped charges.

32. The apparatus of claim 31, further comprising at least a detector to receive signals reflected from the earth sub-surface in response to the seismic signals.

33. The apparatus of claim 31, wherein each anchoring device comprises:

a housing to receive a respective perforating shaped charge, the housing of the anchoring device having a tapered portion for insertion into the earth surface.

34. The apparatus of claim 31, wherein each retainer has a profile engaged to a corresponding perforating shaped charge.

35. The apparatus of claim 34, wherein each retainer has a bore receiving a respective detonator.

36. The apparatus of claim 35, wherein each anchor device has a profile to which the perforating shaped charge is engaged, a respective retainer adapted to hold the perforating shaped charge against the anchor device profile.

* * * * *